United States Patent
Norton et al.

(10) Patent No.: US 10,735,418 B2
(45) Date of Patent: *Aug. 4, 2020

(54) METHOD AND SYSTEM FOR SERVICE VERIFICATION USING ACCESS CONTROL SYSTEM

(71) Applicant: Tyco Fire & Security GmbH, Neuhausen am Rheinfall (CH)

(72) Inventors: Alexandra K. Norton, Duxbury, MA (US); Tyler H. Brown, New Haven, CT (US); Miguel Galvez, Plaistow, NH (US)

(73) Assignee: Johnson Controls Fire Protection LP, Boca Raton, FL (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/707,142

(22) Filed: Sep. 18, 2017

(65) Prior Publication Data

US 2019/0089703 A1    Mar. 21, 2019

(51) Int. Cl.
*H04L 9/00* (2006.01)
*H04L 29/06* (2006.01)
(Continued)

(52) U.S. Cl.
CPC .......... *H04L 63/0876* (2013.01); *G08B 29/12* (2013.01); *H04L 63/083* (2013.01);
(Continued)

(58) Field of Classification Search
CPC .................................................. H04L 63/0876
See application file for complete search history.

(56) References Cited

U.S. PATENT DOCUMENTS 6,150,936 A    11/2000  Addy
7,633,392 B2   12/2009  Neuwirth
(Continued)

FOREIGN PATENT DOCUMENTS

WO    WO 2012130670    10/2012

OTHER PUBLICATIONS

European Search Report, dated Mar. 6, 2019, from European Patent Application No. 18194956.1, filed on Sep. 17, 2018. 9 pages.
(Continued)

*Primary Examiner* — Josnel Jeudy
(74) *Attorney, Agent, or Firm* — HoustonHogle LLP

(57) ABSTRACT

A service management system facilitates and validates service on building management systems installed in a building with an access control system. A service workflow module receives device events from control panels of the building management systems and combines them with local service data from mobile computing devices of technicians performing the service, generating service events. A validation module receives the service events and retrieves access control events from an access control system controller of the access control system and determines whether they are coherent. The service workflow module also infers the location of the technician based on the access control events and sends service eligible devices to be displayed on the mobile computing devices of the technicians. In an alternative embodiment, device events from a building automation system such as a heating, ventilation and air-conditioning system are further used to validate the service events.

19 Claims, 7 Drawing Sheets

(51) Int. Cl.
*H04W 12/06* (2009.01)
*G08B 29/12* (2006.01)

(52) U.S. Cl.
CPC .............. *H04L 63/10* (2013.01); *H04W 12/06* (2013.01); *H04L 2463/121* (2013.01)

(56) References Cited

U.S. PATENT DOCUMENTS

| | | |
|---|---|---|
| 9,900,115 B2 | 2/2018 | Rauworth et al. |
| 2004/0217857 A1 | 11/2004 | Lennartz et al. |
| 2007/0055760 A1* | 3/2007 | McCoy ................ H04L 41/22 709/223 |
| 2007/0232288 A1 | 10/2007 | McFarland et al. |
| 2008/0084291 A1 | 4/2008 | Campion et al. |
| 2008/0218330 A1 | 9/2008 | Biles et al. |
| 2009/0256699 A1 | 10/2009 | Huseth et al. |
| 2012/0259583 A1 | 10/2012 | Noboa et al. |
| 2013/0169681 A1 | 7/2013 | Rasane et al. |
| 2013/0308674 A1 | 11/2013 | Kramer et al. |
| 2014/0119674 A1 | 5/2014 | Das et al. |
| 2014/0218164 A1 | 8/2014 | Mahapatra et al. |
| 2014/0292348 A1 | 10/2014 | Kanne et al. |
| 2015/0051749 A1 | 2/2015 | Hancock et al. |
| 2015/0142491 A1 | 5/2015 | Webb |
| 2015/0260541 A1* | 9/2015 | Smith ................ G01C 21/206 701/439 |
| 2015/0261229 A1 | 9/2015 | Roy |
| 2015/0262114 A1 | 9/2015 | Ming |
| 2015/0308704 A1 | 10/2015 | Jung et al. |
| 2015/0312696 A1* | 10/2015 | Ribbich ................ H04W 4/33 455/418 |
| 2015/0316907 A1 | 11/2015 | Elbsat et al. |
| 2015/0327010 A1 | 11/2015 | Gottschalk et al. |
| 2016/0187127 A1 | 6/2016 | Purohit et al. |
| 2016/0327293 A1* | 11/2016 | Grabowski .............. F24F 11/30 |
| 2017/0011312 A1 | 1/2017 | Subramanian et al. |
| 2017/0074536 A1 | 3/2017 | Bentz et al. |
| 2017/0090441 A1 | 3/2017 | Schmitt et al. |
| 2017/0188188 A1 | 6/2017 | Kang |
| 2017/0213303 A1 | 7/2017 | Papadopoulos et al. |
| 2018/0279067 A1 | 9/2018 | Ivanov et al. |
| 2019/0325368 A1 | 10/2019 | Turney et al. |

OTHER PUBLICATIONS

European Search Report, dated Mar. 4, 2019, from European Patent Application No. 18194957.9, filed on Sep. 17, 2018. 10 pages.
European Search Report, dated Feb. 20, 2019, from European Patent Application No. 18194953.8, filed on Sep. 17, 2018. 8 pages.
European Search Report, dated May 22, 2019, from European Patent Application No. 18195315.9, filed on Sep. 18, 2018. 10 pages.
European Search Report, dated Feb. 15, 2019, from European Patent Application No. 18195315.9, filed on Sep. 18, 2018. 12 pages.
European Search Report dated Feb. 28, 2019 for European Patent Application No. 18194954.6 filed Sep. 17, 2018. 10 pages.
European Search Report dated Mar. 1, 2019, from European Patent Application No. 18194955 filed Sep. 17, 2018. 9 pages.

* cited by examiner

METHOD AND SYSTEM FOR SERVICE VERIFICATION USING ACCESS CONTROL SYSTEM

RELATED APPLICATIONS

This application is related to:

U.S. application Ser. No. 15/707,135, filed on Sep. 18, 2017, entitled "Method and Apparatus for Cloud Based Predictive Service Scheduling and Evaluation," now U.S. Patent Publication No.: 2019/0086877;

U.S. application Ser. No. 15/707,148, filed on Sep. 18, 2017, entitled "Method and System for Service Verification Using WiFi Signal Strength Mapping," now U.S. Patent Publication No.: 2019/0090215;

U.S. application Ser. No. 15/707,154, filed on Sep. 18, 2017, entitled "Method and Apparatus for Mapping Devices by Using Posted Maps," now U.S. Patent Publication No.: 2019/0087078;

U.S. application Ser. No. 15/707,161, filed on Sep. 18, 2017, entitled "Method and Apparatus for Verifying Service of Installed Devices Using RFID," now U.S. Patent Publication No.: 2019/0088109; and U.S. application Ser. No. 15/707,167, filed on Sep. 18, 2017, entitled "Method and Apparatus for Evaluation of Temperature Sensors," now U.S. Patent Publication No.: 2019/0086881.

All of the afore-mentioned applications are incorporated herein by this reference in their entirety.

BACKGROUND OF THE INVENTION

Building management systems such as building automation systems, fire alarm systems and intrusion systems are often installed within a premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

Fire alarm systems typically include fire control panels that function as system controllers. Fire detection/initiation devices and alarm notification devices are then installed, distributed throughout the buildings and connected to the panels. Some examples of fire detection/initiation devices include smoke detectors, carbon monoxide detectors, flame detectors, temperature sensors, and/or pull stations (also known as manual call points). Some examples of fire notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the distributed device is activated and a signal is sent from the activated distributed device to the fire control panel. The fire control panel then initiates an alarm condition by activating audio and visible alarms of the fire notification devices of the fire alarm system, which are also distributed around the building. Additionally, the fire control panel will also send an alarm signal to a monitoring station, which will notify the local fire department or fire brigade.

Intrusion systems typically include intrusion panels and their own distributed devices. The distributed monitoring devices detect indications of intrusions, building security breaches and unauthorized access at or within the building and report to the intrusion panels. Examples of monitoring devices include motion sensor devices, door and window relays, thermal sensors, and surveillance camera devices that communicate with the intrusion panel over a security network. Motion sensor devices can detect intrusions and unauthorized access to the premises, and send indications of the intrusions to the security panel. The surveillance camera devices capture video data of monitored areas within the premises, in examples.

Building automation systems will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include air handlers and systems of ducts and vents for circulating air throughout the building. Business-specific systems include computer systems, manufacturing systems that include various types of computer-aided machinery and test equipment, and inventory control and tracking systems, in examples.

Building management systems require service, including installation, repair, testing, inspection, and compliance testing. When the systems are initially installed, the panels are typically located in a secure part of the building. Then, the distributed devices are installed throughout the building. The panels and the distributed devices must then be interconnected. Wired systems are often used. Although, in some cases wireless links are used to provide interconnection. Then later in the lifecycle, repair may be required. Sensor-type distributed devices can be damaged. They can also become dirty. Inspection and compliance testing is also mandatory for many types of building management systems. Fire alarm systems must be tested typically on a yearly basis, for example.

Recently, it has been proposed to use connected services systems to monitor fire alarm systems. Connected services systems are remote systems that communicate with the building management systems and are sometimes administered by separate business entities than the owners and/or occupants of the buildings, which contain the building managements systems. For example, the connected services system can be administered by a building management system manufacturer and/or an entity providing service on the building management systems.

Often during service, the connected services systems communicate with the control panel of a fire alarm system and mobile computing devices operated by on-site technicians. This has allowed the control panels to report status information, including devices events from distributed devices connected to the panels, to the connected services systems. Similarly, this has allowed the mobile computing devices, via mobile applications, to display information about the fire alarm systems, receive local service data, including inspection results, service narrative information and/or service completion status for different distributed devices, and send the local service data to the connected services system. By facilitating communication between the control panels and mobile computing devices, and by collecting and storing device events and local service data, connected services systems have been used to facilitate service on fire alarm systems.

For example, typically, the fire alarm devices are periodically tested by technicians (e.g., monthly, quarterly, or annually depending on fire or building codes) to verify that the distributed devices are physically sound, unaltered, working properly, not obstructed, properly labeled, and located in their assigned locations.

This testing of the distributed devices is often accomplished with a walkthrough test. During an inspection, the connected services system receives device events from the control panel, which originated from the distributed devices and local service data from a mobile computing device, including inspection results. Illustrated by way of example, upon activation of a fire alarm device, the control panel receives a signal from the activated device. Event data are generated and sent to the connected services system. The event data are stored and/or logged by the connected services system and also sent to the mobile computing device in real-time. The on-site technician is able to view the event data and verify that the fire alarm device is physically sound, unaltered, working properly, and in its assigned location. The mobile computing device then sends local service data including inspection results to the connected services system, and the technician moves to test the next fire alarm device.

Many buildings also include access control systems. The access control systems typically include components such as system controllers, access control readers, and door controllers, to list a few examples.

The access control readers are often installed at access points of the buildings to control access to restricted areas, such as buildings or areas of the buildings. Examples of access points include front and interior doors of a building, elevators, hallways connecting two areas of a building, to list a few examples. The access control readers authenticate identities of (or authorize) individuals and then permit those authenticated individuals to access the restricted areas through the access points. Typically, individuals interact with the access control readers by swiping keycards or bringing contactless smart cards within range (approximately 2-3 inches or 5 centimeters) of a reader. Newer frictionless systems often rely on wireless communication between mobile computing devices carried by the individuals and the access controllers for the access point. The access control readers read the information of the keycards and/or transmitted from the mobile computing devices and then the access control systems determine if the individuals are authorized to access the restricted areas. If the individuals are authorized to enter the restricted areas, then the access control readers allow access to the restricted areas by unlocking locked doors, signaling that doors should be unlocked, and activating elevators. Alarms can be generated upon unauthorized entry.

SUMMARY OF THE INVENTION

Certain types of service for building management systems are mandated by regulations. Entities can be audited by local regulatory bodies in order to verify that the services were completed. If the customer does not have such verification, their business could be impacted and the service can be required to be repeated and verified.

At the same time entities performing the service often want confirmation that the technician actually performed the service. Specifically, many types of service simply require the technician to observe the state of a device. That is, the technician determines whether the device has been damaged or covered over, is fully charged, and/or is located at its assigned position. The service entity at some level has to trust that the technician actually performed this job.

It is desirable to have a system that can verify that technicians providing service were in the area of the devices needing service and actually remained in that area for a period of time consistent with that generally required for designated service procedures, and record all relevant service details. This allows the service entity to audit the technicians work.

According to the present invention, detailed installation and service data for a building management system is sent to a connected services system. That data is collected with specificity regarding the type and location of device being serviced, such as installed, configured, tested or repaired, among other examples. After a sufficient amount of data is collected, an accurate model will have been generated, via a predictive analysis process, for predicting how long certain services take to perform.

By combining the features of the connected services system described above with information from an access control system located at the building where the service is being performed, it is possible to provide verification and documentation of that service. The access control data can be used to prove that technicians have actually entered the area to perform services and also that the time that they spent in the area is consistent with the model generated by the predictive analysis process. The information from the access control system will be logged for future reference as further evidence that the work has actually been completed.

Another feature includes the ability to verify and facilitate the service in real time. For example, the connected services system can verify that the technician has actually badged into the area where the equipment is located before being allowed to enter local service data regarding service or testing that was provided.

Additionally, according to the current invention, data from other systems such as HVAC systems, can be further used to verify service. In one example, status information from an air handler of an HVAC system is used to confirm that a fire alarm system installed in the same building is interfacing properly with the HVAC system and that the air handler shut down and/or duct dampers close in response to activation of a smoke detector of the fire alarm system.

In general, according to one aspect, the invention features a service management system for facilitating testing of a building management system of a building. The service management system includes a service workflow module, an access control system interface and a validation module. The service workflow module receives device events from the building management system and local service data from a mobile computing device operated by a technician and generates service events. The access control system interface receives access control events from an access control system for the same building as the building management system. The validation module analyzes the service events from the service workflow module and the access control events to validate the service on the building management system.

In embodiments, the validation module validates service events on the building management system based on whether the access control events indicate that access was granted to the technician by the access control system to zones of the building containing distributed devices and/or control panels of the building management system that were indicated in the service events. The analysis can be further based on a comparison of a duration of time spent in zones of the building containing the distributed devices and/or control panels with a predetermined threshold.

In further examples, for fire alarm systems, the validation module validates testing the release of a fire door by determining whether the access control events indicate that the fire door closed, and validates testing of egress routes unlocked in response to an alarm state by determining whether the access control events indicate that the access points along the egress routes were unlocked and/or accessed.

In general, according to another aspect, the invention features a service management system for facilitating testing of a building management system of a building. The service management system includes an access control system interface and a service workflow module. The access control system interface receives access control events from an access control system for the building, and the service workflow module infers a zone of the building in which a technician is located based on the access control events, provides service eligibility information to a mobile computing device of the technician based on the inferred zone, receives local service data from the mobile computing device and logs the local service data.

In embodiments, graphical user interfaces of the mobile computing devices display the service eligibility information and detect input from the technician indicating local service data. The service eligibility information includes an indication of distributed devices and/or control panels of the building management system located in the same zone as the inferred zone, and the inferred zone is based on the most recent access control event and/or a sequence of access control events.

In general, according to another aspect, the invention features a method for facilitating testing of a building management system of a building. A service workflow module receives device events from the building management system and local service data from a mobile computing device operated by a technician, generates service events, and sends the service events to a validation module. The validation module receives access control events from an access control system for the building via an access control system interface and analyzes the service events from the service workflow module and the access control events to validate the service on the building management system.

In general, according to another aspect, the invention features a method for facilitating testing of a building management system of a building. A service workflow module receives access control events from an access control system via an access control system interface, infers a zone of the building in which a technician is located based on the access control events, provides service eligibility information to a mobile computing device of the technician based on the inferred zone, receives local service data from the mobile computing device, and logs the local service data.

In general, according to another aspect, the invention features a method for facilitating testing of a fire alarm system of a building. A fire alarm control panel sends instructions to release fire doors of the fire alarm system and/or unlock doors along egress routes of the building in response to an alarm state. A service workflow module receives results of inspections of the fire doors and/or the doors along the egress routes from mobile computing devices, generates service events, and sends the service events to a validation module. The validation module receives access control events from an access control system for the building via an access control system interface and determines whether the access control events indicate that the fire door closed and/or that the doors along the egress routes were unlocked.

In general, according to another aspect, the invention features a method for facilitating testing of a fire alarm system of a building. The method comprises a fire alarm control panel sending instructions to a building automation system control panel to stop air handlers and/or close dampers of the building heating and/or cooling system (e.g., HVAC system), for example, in response to an alarm state, the building automation system control panel sending information about the state of the air handlers and/or dampers to a connected services system, and the connected services system and/or a technician determining whether the air handlers stopped operating and/or the dampers closed during the alarm state based on the information from the building automation system control panel.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
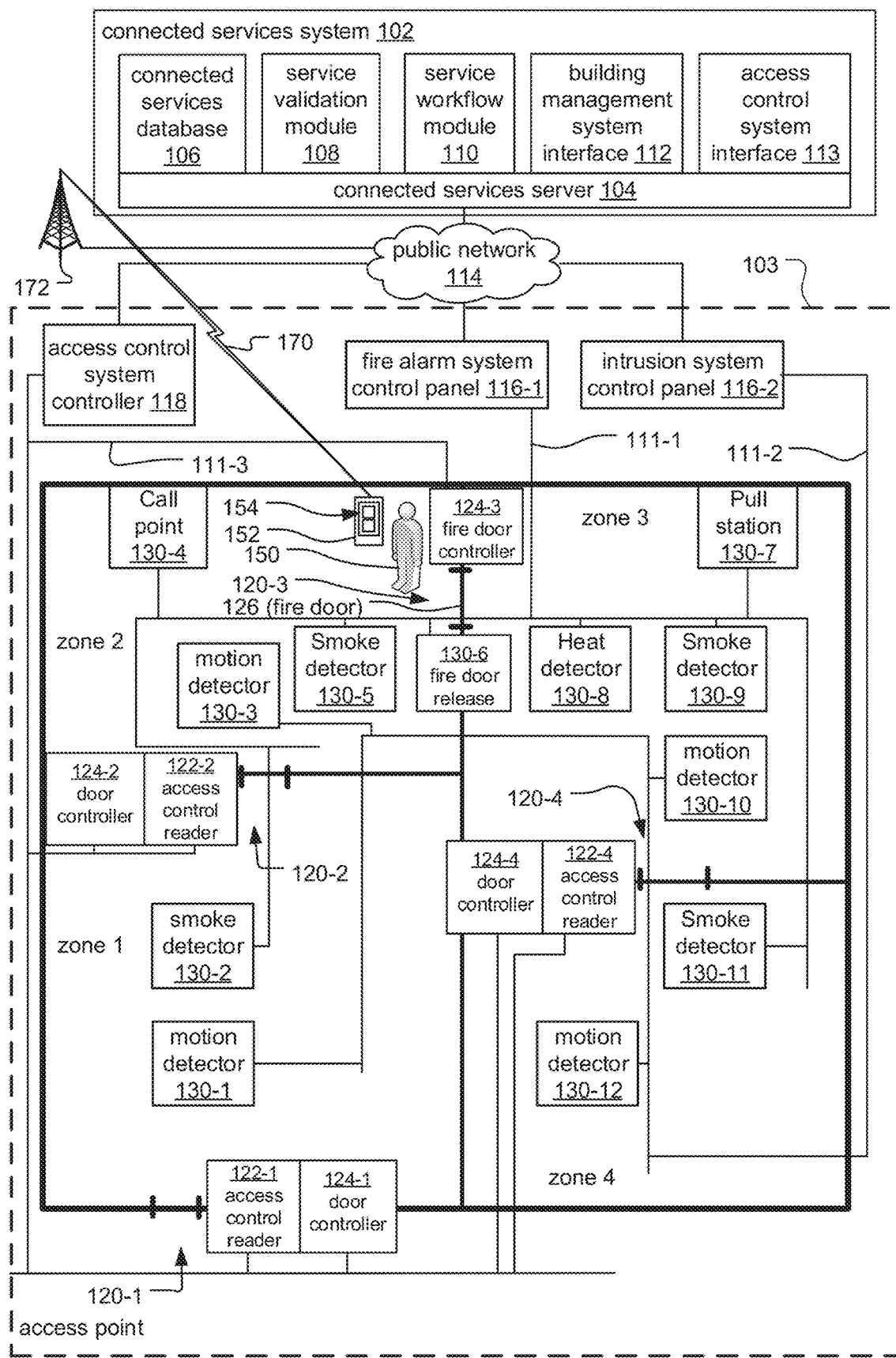
FIG. 1 is a schematic diagram of a service management system according to an embodiment of the current invention.

FIG. 1 is a schematic diagram of a service management system according to an embodiment of the current invention.

The service management system includes a connected services system 102, which, at a high level, communicates with building management systems and an access control system installed within buildings 103 of various client entities, typically. Examples of client entities include residential, commercial, or governmental companies or agencies. Examples of the buildings include offices, hospitals, warehouses, retail establishments, shopping malls, schools, multi-unit dwellings, government buildings, or casinos, to list a few examples.

In the illustrated example, the building 103 is divided into zones 1-4, with access points 120 providing access to the zones. More specifically, access point 120-1 provides access from the exterior of the building to zone 1, access point 120-2 provides access between zone 1 and zone 2, access point 120-3 provides access between zone 2 and zone 3, and access point 120-4 provides access between zone 3 and zone 4.

In general, the building management systems include control panels 116 and distributed devices 130. The control panels 116 direct the function of the respective building management system by determining and displaying the operational status of or sensor data from the distributed devices 130.

The distributed devices 130 are connected to their respective control panels 116 via safety and security wired and/or wireless networks 111 of the building 103. These networks 111 support data and/or analog communication between the distributed devices 130 and the respective control panels 116. In some embodiments (not illustrated), the distributed devices 130 could all be connected to the same safety and security network 111.

In the illustrated example, distributed fire alarm devices 130 of the fire alarm system are connected to a fire alarm system control panel 116-1 via safety and security network 111-1 and are slave devices of the panel.

The distributed fire alarm devices 130 include alarm initiation devices including smoke detectors 130-2, 130-5, 130-9, 130-11, heat detectors 130-8 and manually activated devices such as call points 130-4 and pull stations 130-7. Alarm initiation devices can also include devices that are not depicted in the illustrated example, including carbon monoxide detectors. The alarm initiation devices monitor the buildings for indicators of fire. Upon detection of indicators of fire, device signals are sent from the alarm initiating devices to the control panel. The device signals are typically alarm signals and/or analog values. The alarm signals are used to signal the control panel that a fire has been detected. Alternatively, some devices provide analog values to indicate measured conditions. In one example, temperature sensors provide analog values for measured temperatures. In another example, smoke sensors provide analog values indicating smoke obscuration levels. The control panel then determines if the analog values are indicative of a fire. Additionally, in some examples, the alarm initiation devices provide both alarm signals and analog values.

The distributed fire alarm devices 130 could further include fire notification devices (not illustrated), which notify occupants of the building 103 of a potential fire and generally include speakers, horns, bell, chimes, light emitting diode (LED) reader boards, and/or flashing lights (e.g., strobes), to list a few examples. In response to detection of indicators of fire, the fire alarm system control panel 116-1 initiates an alarm state, which activates the fire notification devices.

The fire alarm system also includes a fire door 126 at access point 120-3. The fire door 126 is a door that is typically held open during normal operation and closed by a fire door release 130-6 in response to an alarm state, under control of the access control system controller 118 and/or the fire alarm system control panel 116-1.

Similar to the fire alarm system, distributed devices 130 of the intrusion system are connected to an intrusion system control panel 116-2 via a second network 111-2.

The distributed intrusion devices 130 include devices for detecting the presence of unauthorized individuals in the building 103, including motion detectors 130-1, 130-3, 130-10, 130-12 and other devices (not illustrated) such as security cameras, door and window relays and network video recorders, among other examples. Upon detection of the presence of unauthorized individuals, device signals are sent from the motion detectors 130-1, 130-3, 130-10, 130-12 to the intrusion control panel 116-2.

The present system can be extended to other types of building management systems. For example in another implementation the panel is a building automation panel such as a panel that might control building climate including HVAC.

The access control system includes an access control system controller 118, access control readers 122, and door controllers 124, connected via a third safety and security network 111-3.

The access control readers 122 receive user credentials, typically from individuals swiping keycards or bringing contactless smart cards within range of an access control reader 122. The access control system controller 118 validates the user credentials, including whether the user is authorized to access specific access points 120, and sends instructions to the door controllers 124 to open or unlock the selected access points 120. The door controllers 124 open or unlock the access points 120 in response to instructions from the access control system controller 118 and also include door position sensors for determining the status of access points 120 such as whether they are locked, unlocked, open or closed. Additionally, the access control system controller 118 maintains access control events, which include information about access points 120 that were engaged with, including date and time information and the identity of individuals who engaged with the access points 120, and door position information, among other examples.

In the illustrated example, a technician 150 holding a mobile computing device 152 is located in zone 2. The technician 150 is an individual performing service on the building management systems, including employees of entities occupying the building 103, property managers, building management system manufacturers and/or providers of service for building management systems.

The mobile computing device 152 presents information about the building management systems, including real time status information of the distributed devices 130 such as whether signals have been received from those devices by the control panels 116 and date and time information pertaining to the received signals, receives local service data, including inspection results, service narrative information and/or service completion status for different devices, and sends the local service data to the connected services system 102. In the illustrated example, the mobile computing device 152 is a smartphone device. Alternatively, the mobile computing device 152 could be a laptop computer, tablet computer, phablet computer (i.e., a mobile device that is typically larger than a smart phone, but smaller than a tablet), smart watch, or specialized service and/or testing device to list a few examples.

Each of the fire alarm system control panel 116-1, intrusion system control panel 116-2, access control system controller 118 and mobile computing device 152, are connected to the connected services system 102 via a leased data connection, private network and/or public network 114, such as the internet. In some cases, the control panels 116 have been given network connectivity to communicate with the connected services system 102; in other cases, testing computers connected to the control panels 116 function as gateways. The mobile computing device 152 connects to the public network 114 via a wireless communication link 170 to a cellular radio tower 172 of a mobile broadband or cellular network or public and/or private wired data networks such as an enterprise network, Wi-Max, or Wi-Fi network, for example.

The connected services system 102 is typically implemented as a cloud system. It can be run on a proprietary cloud system or implemented on one of the popular cloud systems operated by vendors such as Alphabet Inc., Amazon, Inc. (AWS), or Microsoft Corporation.

As a result, the connected services system 102 typically operates on a connected services server system 104. In some cases, this server system 104 is one or more dedicated servers. In other examples, they are virtual servers.

The connected services server system 104 executes a number of separate modules, including a service validation module 108 and a service workflow module 110. Each of these modules is associated with separate tasks. In some cases, these modules are discrete modules or they are combined with other modules into a unified code base. They can be running on the same server or different servers, virtualized server system or a distributed computing system.

The service workflow module 110 functions as an application server that communicates with the mobile computing device 152 operated by the technician 150. The service workflow module 110 provides the steps necessary for the technician 150 to service the building management system. The service workflow module 110 further receives the local service data provided by the technician 150 indicating that a particular panel 116 or distributed device 130 of the building management system has been serviced. This local service data may further include inspection results, narrative description from the technician describing the state of a particular panel 116 or distributed device 130, a description of its particular location, and/or notes concerning that panel or distributed device that might be useful for the next service. Further, the service workflow module 110 also receives device events from the particular panel 116 or distributed device 130 undergoing service and combines the device events with the local service data and then stores the resulting service events to a connected services database 106 in connection with the particular service being carried out on the building management system.

Status information for the distributed devices 130 based on the device events is also pushed from the service workflow module 110 to the mobile computing device 152 to be displayed to the technician 150 in order to facilitate testing. For example, in response to activation of distributed devices 130 by the technician 150, the service workflow module 110 sends status information based on device events from the devices to the mobile computing device 152, which displays the status information to the technician 150. In this way, the technician 150 can determine how the distributed devices 130 responded in real time.

The connected services database 106 provides customer specific installation information to the service workflow module 110. In particular, the connected services database 106 includes lists of control panels 116 installed at various customer premises, the distributed devices 130 maintained by those panels, and historical test data associated with those panels and distributed devices.

The connected services system 102 also includes a building management system interface 112 and an access control system interface 113.

The building management system interface 112 operates as the interface between the service workflow module 110 and the particular control panel 116 undergoing service. In particular, the building management system interface 112 converts instructions from the service workflow module 110 into instructions that are formatted into the protocol implemented by the particular panel. Additionally, the building management system interface 112 receives information such as device events from the current control panel 116 or distributed device 130 under service and converts those device events into a uniform format that can be consumed by the service workflow module 110, regardless of the underlying protocol implemented by the panels and distributed devices.

The access control system interface 113 operates as an interface between the service validation module 108 or service workflow module 110 and the access control system controller 118 for the building 103 and the client for which the services are being performed. The access control system interface 113 queries the access control system controller 118 to obtain access control events for the building 103. In particular, the access control system interface 113 queries the access control system controller 118 for access control events associated with key card swipes of the technician 150 at the various access control readers 122 of the building 103.

The service workflow module 110 communicates with the access control system interface 113 in order to determine which distributed devices 130 and/or control panels 116 are eligible for service based on access control events received from the access control system controller 118. The service workflow module 110 infers the current location of the technician 150 based on the access control events and pushes the next device or devices to be serviced to the mobile computing device 152 to be indicated by a graphical user interface (GUI) 154 of the mobile computing device 152.

The service validation module 108 communicates with the service workflow module 110 and the access control interface 113 in order to validate service being performed on the building management system undergoing service. In particular, the service validation module 108 receives service events, including real time service information from the service workflow module 110 or possibly historical service information. At the same time, the service validation module 108 also acquires access control events via the access control system interface 113 from the access control system controller 118 for the building 103 at which the services are being performed. The service validation module 108 then compares the service events including the time at which the service event were generated against the access control events and the time at which the access control events were generated to ensure coherency. In an example, the service validation module 108 confirms that the technician 150 entered into a part of the building 103 through an access control reader 122 that is consistent with the service events that were also generated at that approximate time.

Figure 2:
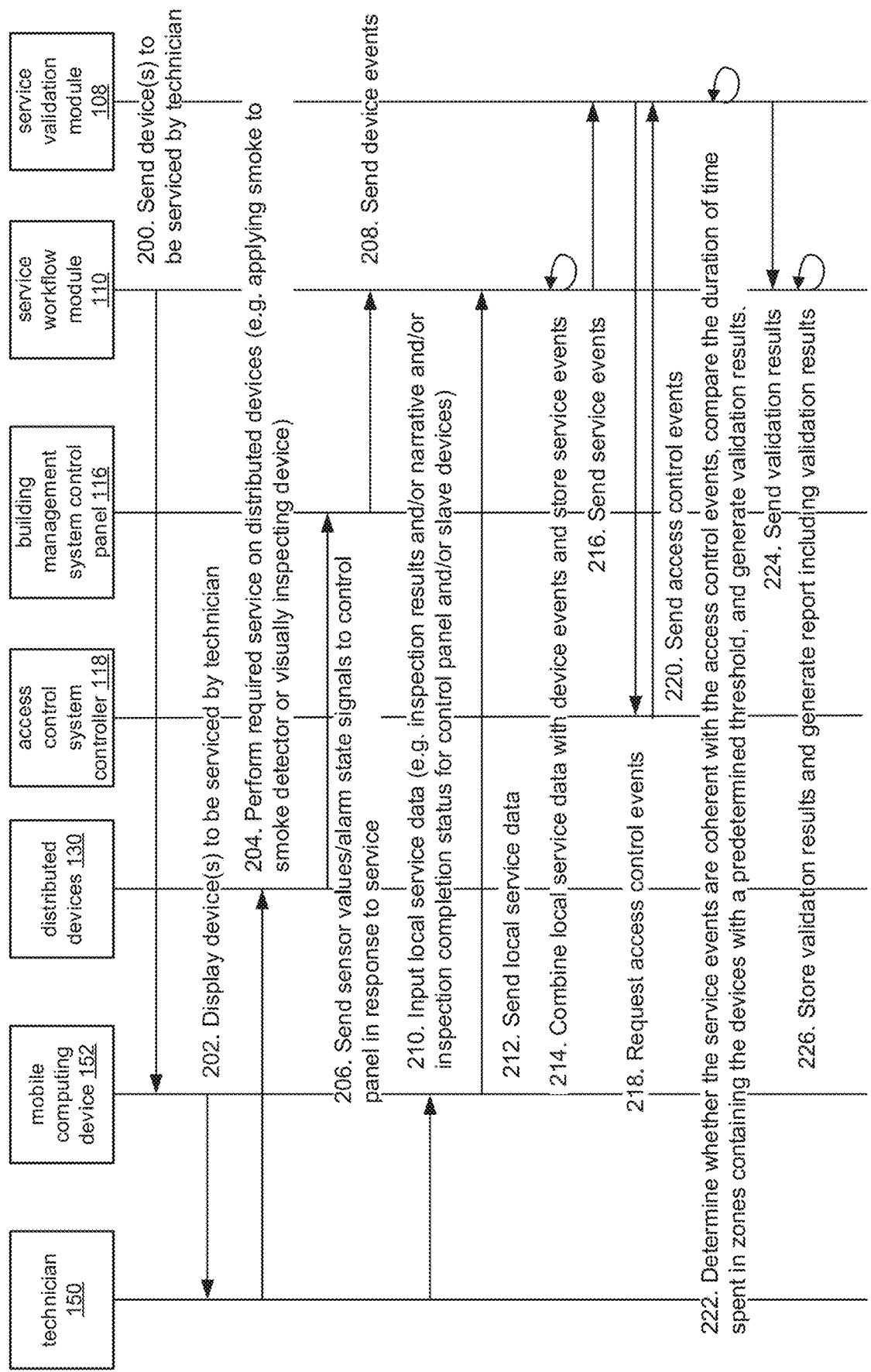
FIG. 2 is a sequence diagram illustrating the process by which the validation module validates service on a building management system.

FIG. 2 is a sequence diagram illustrating the process by which the validation module 108 validates service on the building management system.

In step 200, the service workflow module sends the devices 116, 130 to be serviced to the mobile computing device 152, which displays them to the technician 150 in step 202.

In step 204, the technician 150 performs the service, for example, by applying smoke to a smoke detector in order to test it.

In response, in step 206, the distributed device 130 sends sensor values/alarm state signals to the control panel 116, which generates device events (which can include the sensor values or alarm state signals and time information, for example) and sends the device events to the service workflow module 110 in step 208.

In step 210, the technician 150 also inputs local service data to the mobile computing device 152, and these are sent from the mobile computing device 152 to the service workflow module 110 in step 212.

In step 214, the service workflow module 110 combines the local service data with the device events, resulting in service events, which are stored in the connected services database 106. The service events are sent to the service validation module 108 in step 216.

In response, in step 218, the service validation module requests access control events (including which access points were accessed and opened by the inspector) from the access control system controller 118, and the access control events are sent to the service validation module 108 in step 220.

In step 222, the service validation module 108 compares the access control events to the service events and determines whether the service events are coherent with the access control events. This can be done in a number of ways. In one example, the service validation module 108 determine whether access was to the technician 150 to zones of the building 103 containing distributed devices 130 or control panels 116 that were serviced. In another example, the duration of time spent in zones containing the serviced devices is compared by the service validation module 108 to a predetermined threshold, which is calculated based on service events stored in the connected services database 106.

In step 224, the service validation module returns the validation results to the service workflow module, which stores them and generates a report including the validation results in step 226. The validation results and the generated report are retained as evidence that the service was completed, for example, in the case of an audit.

Figure 3:
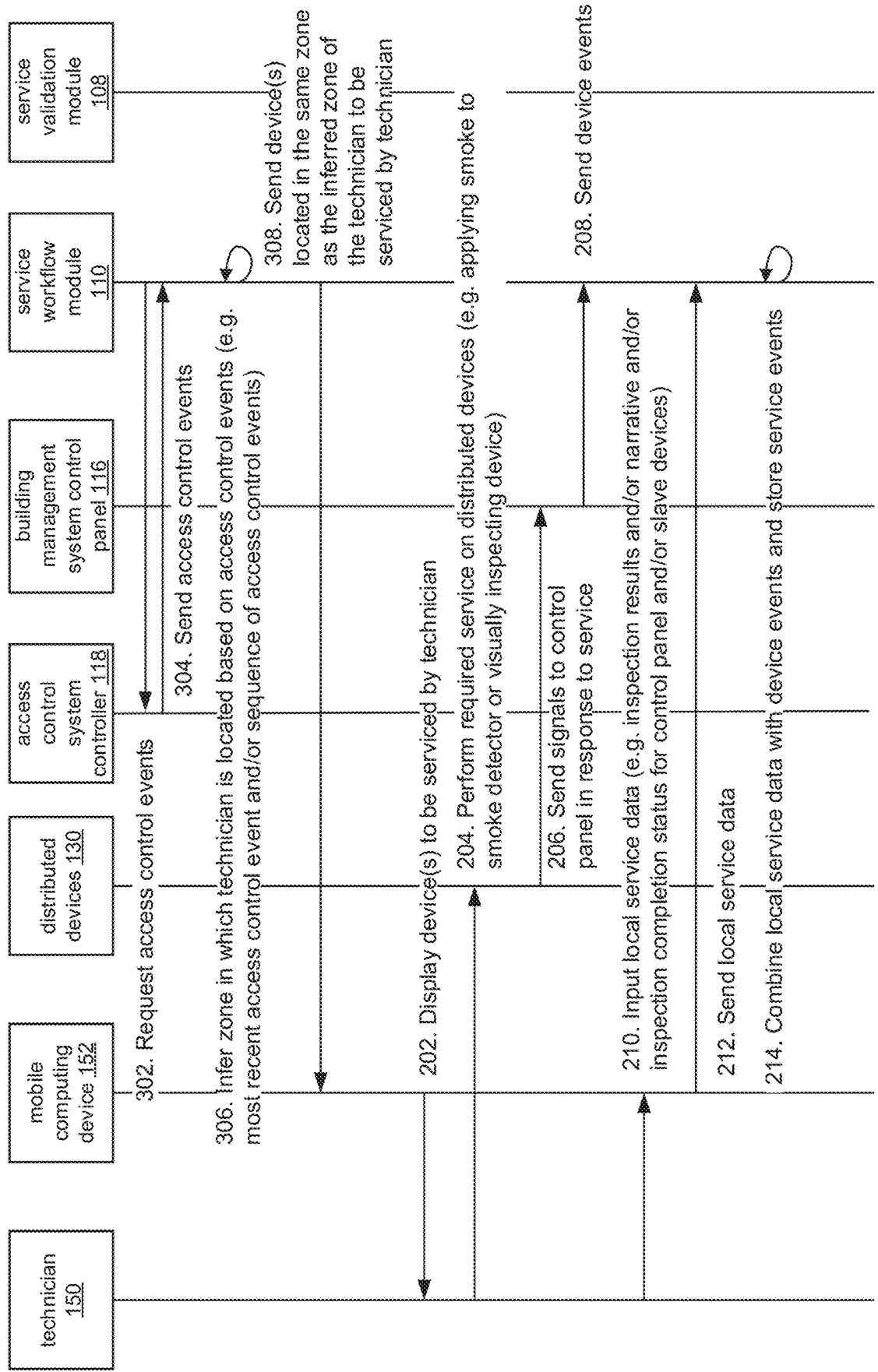
FIG. 3 is a sequence diagram illustrating the process by which the service workflow module facilitates service by sending service eligibility information to a mobile computing device.

FIG. 3 is a sequence diagram illustrating the process by which the service workflow module 110 facilitates service by sending service eligibility information to the mobile computing device 152.

In step 302, the service workflow module 110 requests access control events from the access control system controller 118 via the access control system interface 113. In response, in step 304, the access control events are sent to the service workflow module 110. Steps 302 and 304 are completed continuously, as the technician 150 proceeds throughout the building 103.

In step 306, the service workflow module infers the zone in which the technician 150 is located based on the access control events. The inferred zone is determined based on the most recent access control events and/or a sequence of access control events, among other examples. In step 308, service eligible devices that are located in that zone are sent to the mobile computing device 152.

The service proceeds in steps 202 through 214 as previously described.

Figure 4:
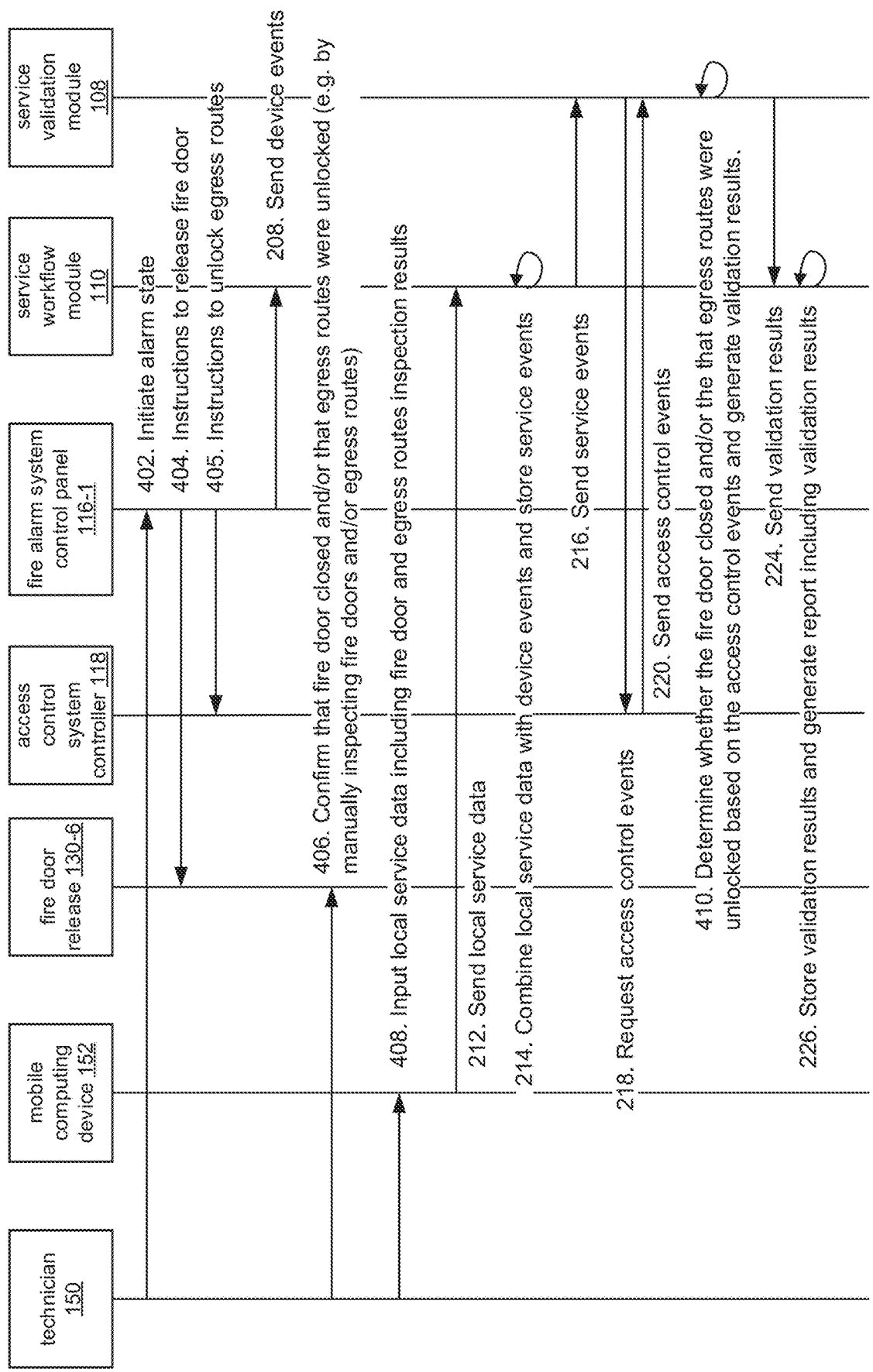
FIG. 4 is a sequence diagram illustrating the process by which the service validation module validates testing of a fire door of a fire alarm system.

FIG. 4 is a sequence diagram illustrating the process by which the service validation module 108 validates testing of a fire door 126 of a fire alarm system.

First, in step 402, the technician 150 initiates an alarm state in the fire alarm system control panel 116-1. This can be done directly or via the mobile computing device 152 or activating an initiation device, among other examples.

In response, in step 404, the fire alarm system control panel 116-1 sends instructions to the fire door release 130-6 to release the fire door 126 and, in step 405, sends instructions to the access control system controller 118 to unlock doors along predetermined egress/evacuation routes within the building 103.

In step 208, the fire alarm system control panel 116-1 sends device events to the service workflow module as previously described.

In step 406, the technician 150 confirms that the fire door closed properly and/or that the egress routes were unlocked, for example, by approaching and inspecting the fire door 130-6 and the access points along the egress routes.

In step 408, the technician 150 enters local service data, including the results of the inspection of the fire door 130-6 and egress routes, into the mobile computing device 152.

Steps 212 through steps 220 then proceed as previously described as service events including the device events and local service data are sent to the service validation module 108, and access control events are retrieved from the access control system controller 118.

In step 410, the service validation module determines whether the fire door closed and/or that egress routes were unlocked based on the access control system events, in particular, based on door position information generated by door position sensors of the fire door controller 124-3 and door controllers 124 along the egress routes. Validation results are generated and sent to the service workflow module which generates a report in steps 224 through 226 as previously described.

Figure 5:
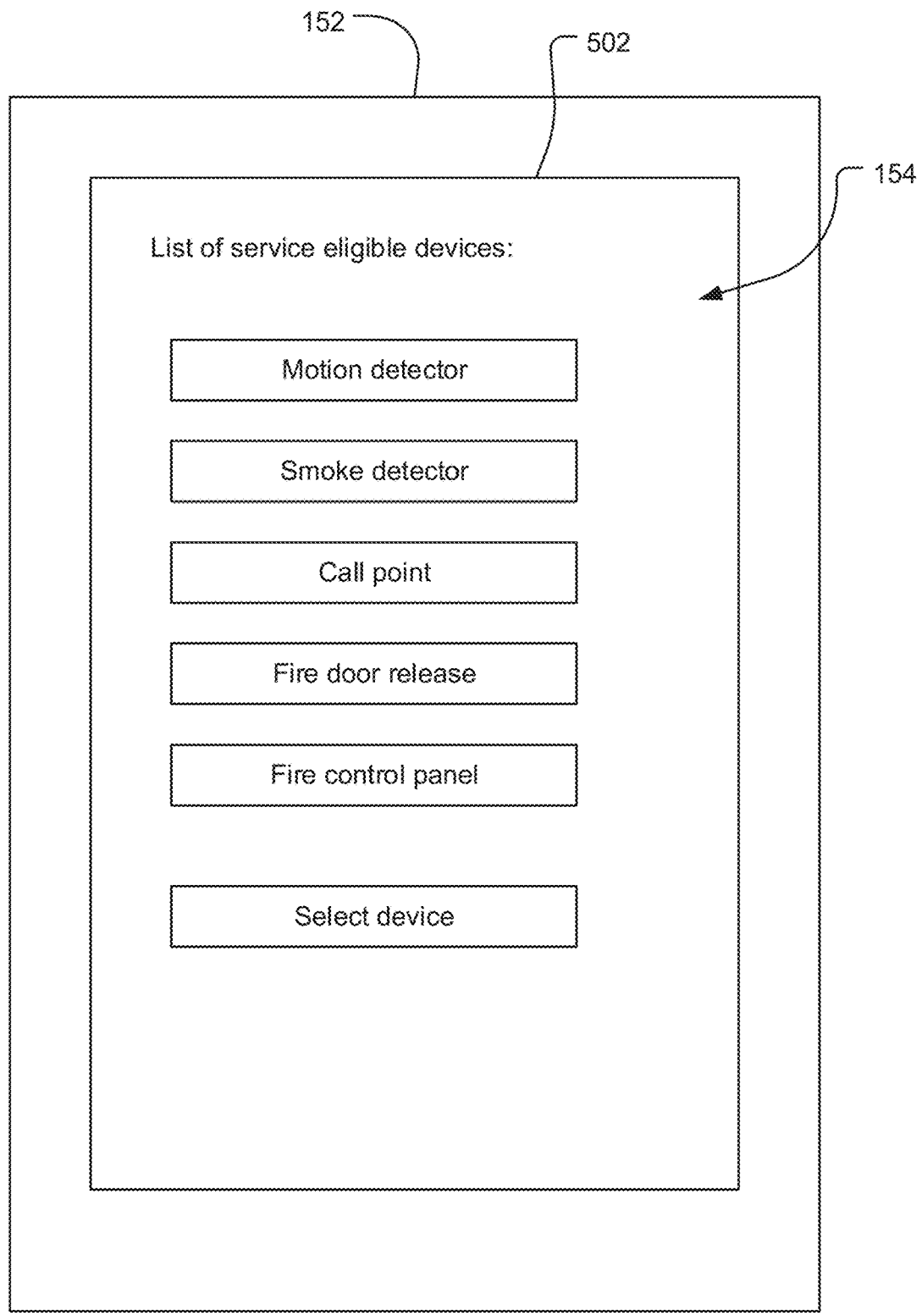
FIG. 5 is a diagram of an exemplary screen of the graphical user interface of the mobile computing device indicating devices eligible for service.

FIG. 5 is a diagram of an exemplary screen of the GUI 154 of the mobile computing device 152.

The GUI 154 is rendered on a touchscreen display 502 of the mobile computing device 152 and indicates service eligible devices which are pushed down from the service workflow module 110 and are based on the access control events retrieved from the access control system controller 118 as previously discussed.

The service eligible devices include a motion detector 130-3, smoke detector 130-5, call point 130-4, fire door release 130-6, and fire control panel 116-1. The particular service eligible devices indicated are those that would be indicated, for example, if the most recent access control event indicates that the technician 150 recently passed through an access point 120 leading to a zone containing those devices.

Additionally, a graphical element labeled "Select device" is included, for indicating which device will be serviced next by the technician 150. When it is selected, the GUI 154 would proceed to a different screen (not illustrated) in which information about the device would be displayed and/or local service data could be entered.

It should be noted that the service eligible devices indicated by the GUI 154 can include the distributed devices 130 of the building management systems, the building management system control panels 116, and/or any other devices that are indicated to be located in the inferred zone based on data accessible to the connected services system 102.

Figure 6:
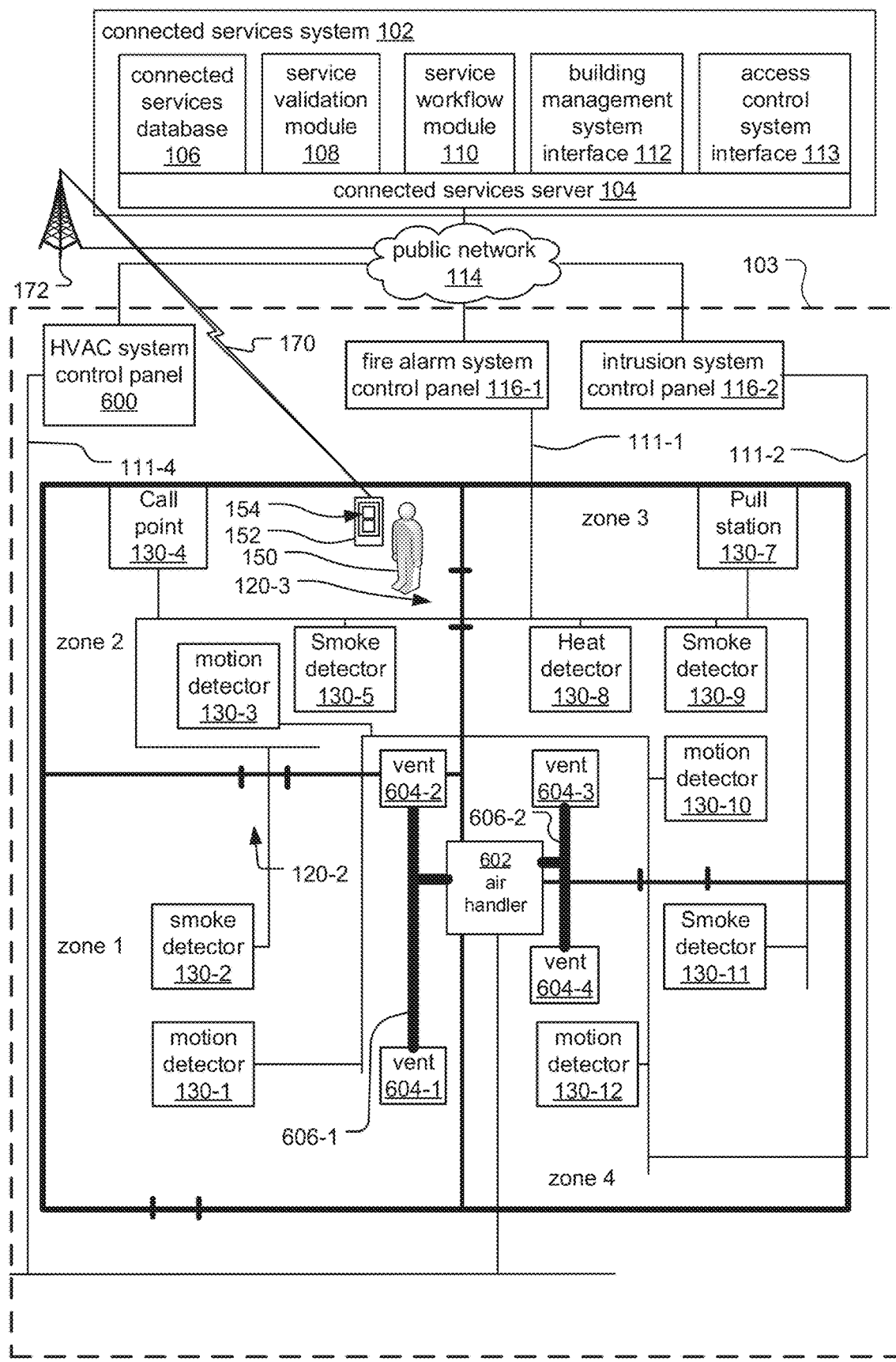
FIG. 6 is a block diagram of the service management system according to an alternative embodiment.

FIG. 6 is a block diagram of a service management system according to an alternative embodiment of the current invention.

Here, instead of an access control system, the building 103 contains a building automation system, such as a heating, ventilation, and air conditioning (HVAC) system. The HVAC system includes an HVAC system control panel 600 connected to an air handler 602 for circulating air through a system of ducts 606 terminating in vents 604, which are distributed throughout the building 103.

As with other building management system control panels 116, the HVAC system control panel 600 directs the function of the HVAC system.

In response to an alarm state, the fire alarm system control panel 116-1 sends instructions to the HVAC system control panel 600 to stop the air handler 602 from operating and/or to close the dampers. These instructions can be sent via the connected services system 102 or a direct communications link (not illustrated) between the two control panels 116-1, 600.

In this embodiment, the service validation module 108 retrieves HVAC device events from the HVAC system control panel and compares them to the service events generated during service to determine whether the air handler 600 properly stopped operating in response to an alarm state in the fire alarm system control panel 116-1 and/or that the dampers closed.

Figure 7:
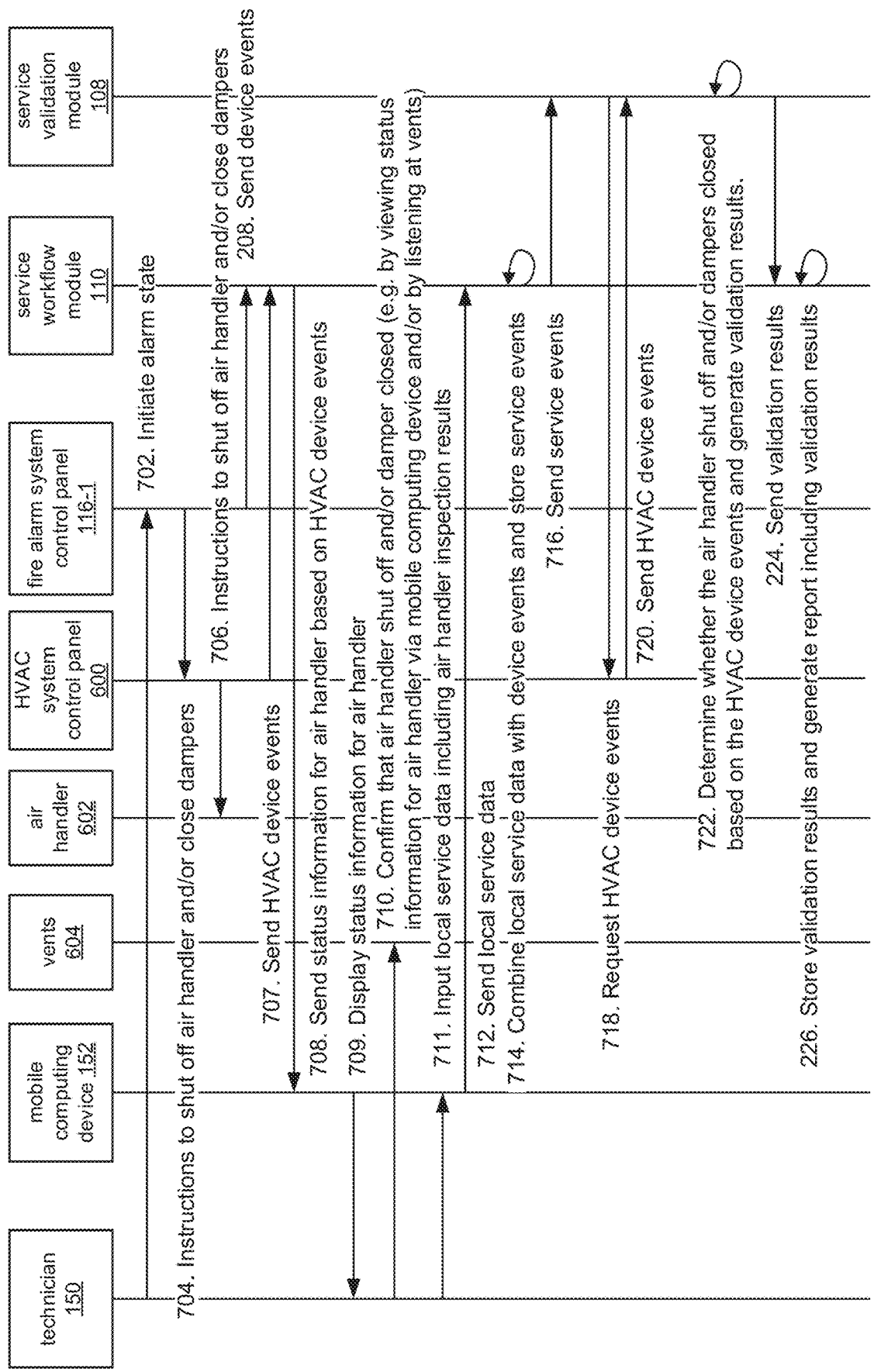
FIG. 7 is a sequence diagram illustrating the process by which the service workflow module facilitates, and the service validation module validates, testing of the interface between an air handler and a fire alarm system control panel.

FIG. 7 is a sequence diagram illustrating the process by which the service workflow module 110 facilitates, and the service validation module 108 validates, testing of an interface between the air handler 602 and the fire alarm system control panel 116-1.

First, in step 702, the technician initiates an alarm state in the fire alarm system control panel 116-1. In response, the fire alarm system control panel 116-1 sends instructions to the HVAC system control panel 600 to stop the air handler 600 from operating and/or to close the dampers, which the HVAC system control panel 600 sends to the air handler 602 in step 706. Device events are also sent from the fire alarm system control panel 116-1 to the service workflow module in step 208 as previously described. Additionally, the HVAC system control panel 600 sends HVAC device events to the service workflow module 110 in step 707.

In step 708, the service workflow module 110 sends status information for the air handler 602 based on the HVAC device events to the mobile computing device 152, which displays the status information to the technician 150 in step 709.

In step 710, the technician 150 confirms that the air handler shut off and/or that the dampers closed, for example, by viewing the status information for the air handler 602 and/or damper position sensors of the dampers via the mobile computing device 152 and/or by listening at one of the vents 604 throughout the building 103. The technician 150 then enters local service data including air handler inspection results into the mobile computing device 152 in step 711.

In step 712, the local service data is sent to the service workflow module 110, which combines the local service data with the device events and stores the service events in step 714.

In step 716, the service events are sent to the service validation module 108, which requests HVAC device events from the HVAC system control panel 600 in step 718 in order to further validate the service. In step 720, the HVAC device events are sent to the service validation module 108, which determines whether the air handler stopped operating based on the HVAC device events and generates validation results in step 722. The report is generated in steps 224 through 226 proceed as previously described.

In this way, the event information from the HVAC system control panel 600 are used by the technician 150, via the service workflow module 110 and the mobile computing device 152, to determine the inspection results, and by the service validation module 108 to further validate and/or document the inspection results.

While this invention has been particularly shown and described with references to preferred embodiments thereof, it will be understood by those skilled in the art that various changes in form and details may be made therein without departing from the scope of the invention encompassed by the appended claims.

What is claimed is:

1. A service management system for facilitating testing of a building management system of a building, comprising:
a service workflow module for receiving device events from the building management system and local service data from a mobile computing device operated by a technician and generating service events;
an access control system interface for receiving access control events from an access control system for the building; and
a validation module for analyzing the service events from the service workflow module and the access control events to validate the service on the building management system, wherein the validation module validates service events on the building management system based on whether the access control events indicate that access was granted to the technician by the access control system to zones of the building containing distributed devices and/or control panels of the building management system that were indicated in the service events.

2. The system as claimed in claim 1, wherein the validation module further validates service on the building management system based on a comparison of a duration of time spent in zones of the building containing the distributed devices and/or control panels with a predetermined threshold.

3. The system as claimed in claim 1, wherein the building management system is a fire alarm system.

4. The system as claimed in claim 3, wherein the validation module validates testing the release of a fire door of the fire alarm system by determining whether the access control events indicate that the fire door closed.

5. The system as claimed in claim 3, wherein the validation module validates testing of egress routes unlocked in response to an alarm state of the fire alarm system by determining whether the access control events indicate that the access points along the egress routes were unlocked and/or accessed.

6. The system as claimed in claim 1,
wherein, during the service on the building management system, the service workflow module infers a zone of the building in which the technician is located based on the access control events, provides service eligibility information to the mobile computing device of the technician based on the inferred zone, and logs the local service data received from the mobile computing device.

7. The system as claimed in claim 6, further comprising graphical user interfaces of the mobile computing devices for displaying the service eligibility information and for detecting input from the technician indicating local service data.

8. The system as claimed in claim 6, wherein the service eligibility information includes an indication of distributed devices and/or control panels of the building management system located in the same zone as the inferred zone.

9. The system as claimed in claim 6, wherein the inferred zone is based on the most recent access control event and/or a sequence of access control events.

10. A method for facilitating testing of a building management system of a building, comprising:
a service workflow module receiving device events from the building management system and local service data from a mobile computing device operated by a technician, generating service events, and sending the service events to a validation module;
the validation module receiving access control events from an access control system for the building via an access control system interface and analyzing the service events from the service workflow module and the access control events to validate the service on the building management system, wherein the validation module validates service events on the building management system based on whether the access control events indicate that access was granted to the technician by the access control system to zones of the building containing distributed devices and/or control panels of the building management system that were indicated in the service events.

11. The method as claimed in claim 10, further comprising the validation module further validating service on the building management system based on a duration of time spent in the zones of the building containing the distributed devices and/or control panels.

12. The method as claimed in claim 10, wherein the building management system is a fire alarm system.

13. The method as claimed in claim 12, further comprising the validation module validating testing the release of a fire door of the fire alarm system by determining whether the access control events indicate that the fire door closed.

14. The method as claimed in claim 12, further comprising the validation module validating testing of egress routes unlocked in response to an alarm state of the fire alarm system by determining whether the access control events indicate that the access points along the egress routes were unlocked and/or accessed.

15. The method as claimed in claim 10, further comprising
the service workflow module, during the service on the building management system, receiving the access control events from the access control system via the access control system interface, inferring a zone of the building in which the technician is located based on the access control events, providing service eligibility information to the mobile computing device of the technician based on the inferred zone, and logging the local service data received from the mobile computing device.

16. The method as claimed in claim 15, further comprising graphical user interfaces of the mobile computing devices displaying the service eligibility information and detecting input from the technician indicating the local service data.

17. The method as claimed in claim 15, wherein the service eligibility information includes an indication of distributed devices and/or control panels of the building management system located in the same zone as the inferred zone.

18. The method as claimed in claim 15, further comprising inferring the zone in which the technician is located based on the most recent access control event and/or a sequence of access control events.

19. The method as claimed in claim 10, wherein the building management system is a fire alarm system, and the method further comprises:
a fire alarm control panel, during the service on the building management system, sending instructions to release fire doors of the fire alarm system and/or unlock doors along egress routes of the building in response to an alarm state;
the service workflow module receiving the local service data, including results of inspections of the fire doors and/or the doors along the egress routes from the mobile computing device; and
the validation module determining whether the access control events indicate that the fire door closed and/or that the doors along the egress routes were unlocked, wherein the access control events include door position information generated by door position sensors for the fire door and/or for the doors along the egress route.

* * * * *